United States Patent

Douglas et al.

[15] 3,640,200
[45] Feb. 8, 1972

[54] FILM-ADVANCING APPARATUS

[72] Inventors: Lawrence M. Douglas, Eastondale; Irving Erlichman, Wayland, both of Mass.

[73] Assignee: Polaroid Corporation, Cambridge, Mass.

[22] Filed: Oct. 21, 1969

[21] Appl. No.: 868,044

[52] U.S. Cl. ..................................................95/19, 95/13
[51] Int. Cl. ...........................................................G03b 19/10
[58] Field of Search..............................95/19, 13, 14, 23, 26

[56] References Cited

UNITED STATES PATENTS 3,511,152  5/1970  Erlichman ................................95/13

*Primary Examiner*—Samuel S. Matthews
*Assistant Examiner*—Richard L. Moses
*Attorney*—Brown and Mikulka and Alfred E. Corrigan

[57] ABSTRACT

A camera having a support for locating a film unit in position for exposure, a shutter for admitting light into the camera to expose the film unit and a film-advancing member for engaging and moving the film unit subsequent to exposure toward the exterior of the camera. A control is positioned between the shutter and the film-advancing member to enable the latter to advance a film unit from its container subsequent to actuation of the shutter and a disenabling member for preventing the film-advancing member from moving another film unit from the container until the preceding film unit has moved a predetermined distance.

8 Claims, 6 Drawing Figures

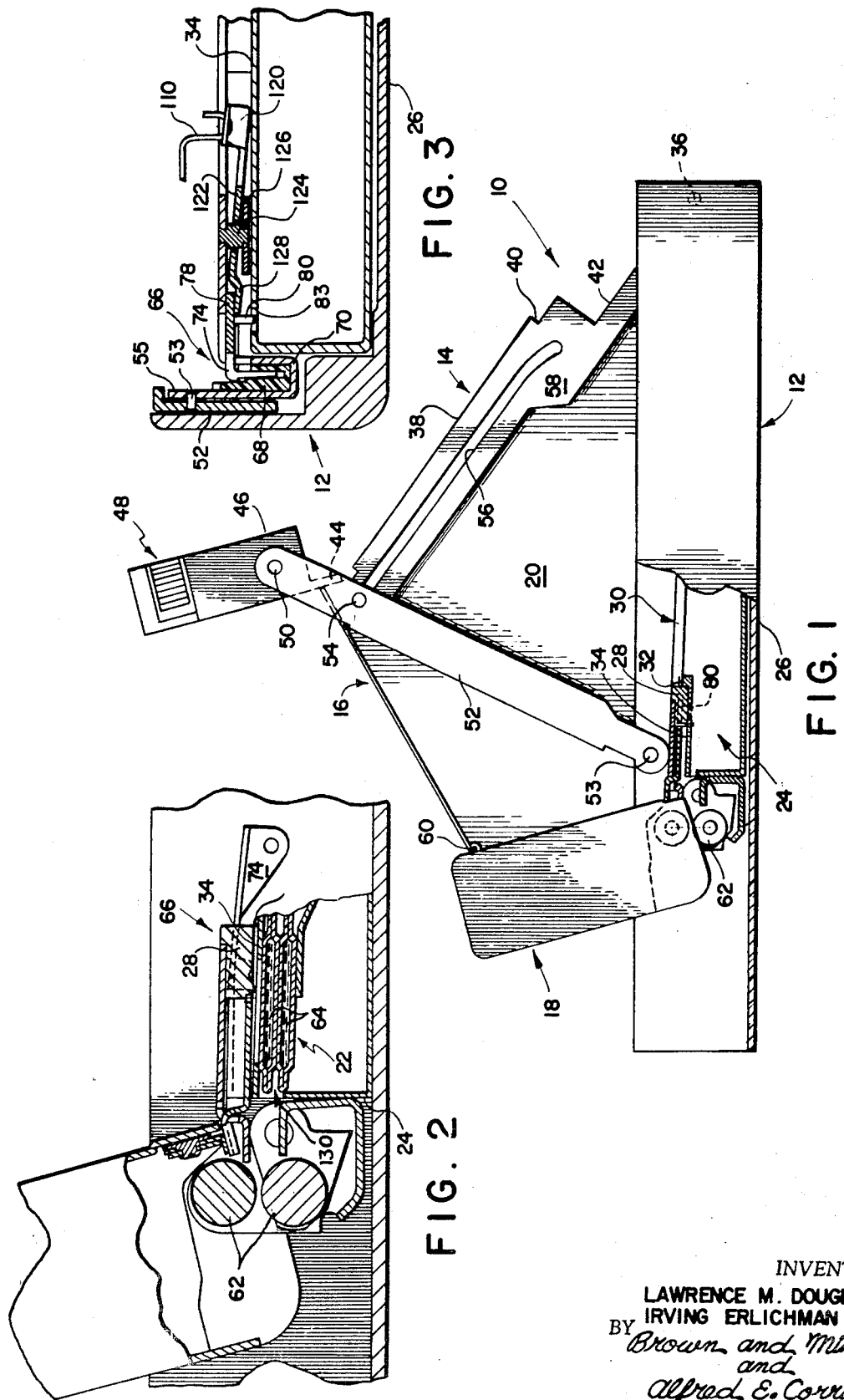

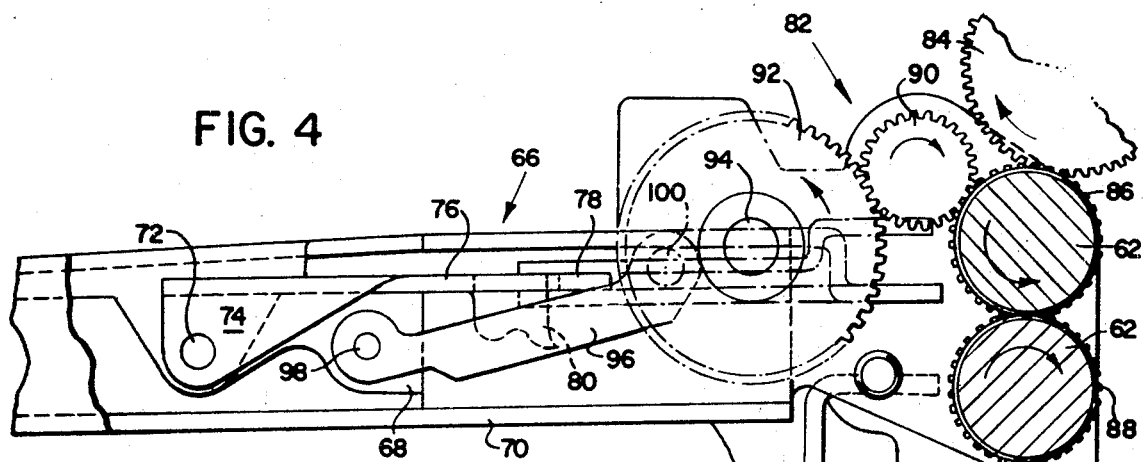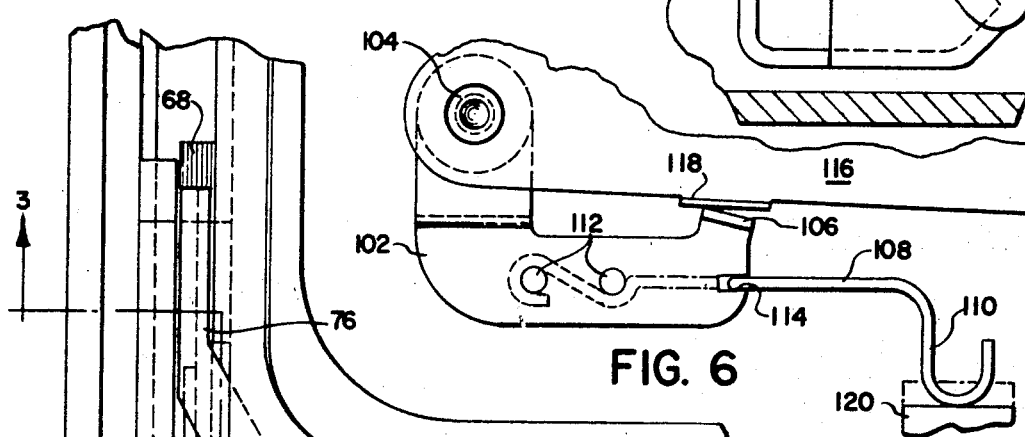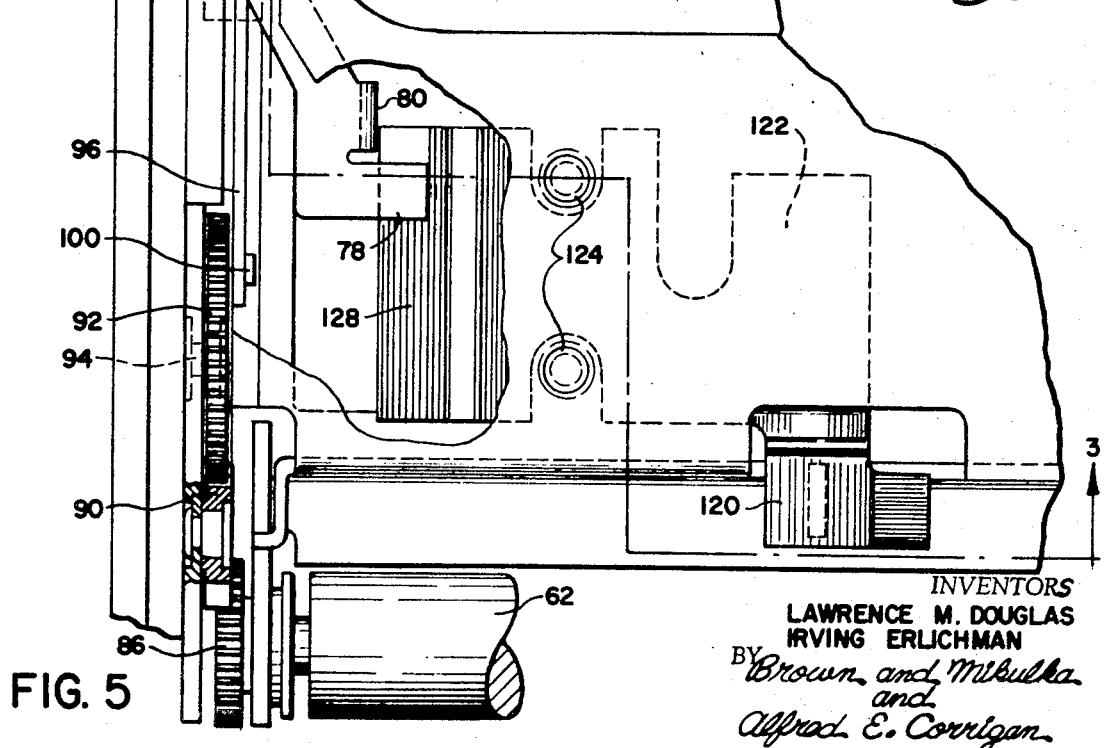

FILM-ADVANCING APPARATUS

BACKGROUND OF THE INVENTION

1. Field of the Invention

The present invention is concerned with improvements in photographic apparatus such as cameras of the self-developing type adapted to be employed with a film assemblage or pack including a container housing a plurality of photosensitive elements or film units arranged in stacked relation and adapted to be exposed, in sequence, within the container and withdrawn therefrom following exposure. Subsequent to being withdrawn from the container, each film unit including, for an example, a photosensitive element and a superposed image-receiving element, is processed by moving the superposed elements between a pair of juxtaposed pressure-applying members, usually rolls, located within the photographic apparatus adjacent an opening in an end wall of the film container, in order to distribute a processing liquid between the superposed elements.

Structure is provided for automatically driving the rolls and for moving the exposed film unit from the container into the nip of the rolls subsequent to exposure of the film unit. This structure may take the form of a film-advancing member mounted for reciprocating motion to engage and move an exposed film unit into engagement with the rolls. It is important that the film-advancing member reciprocate continuously in order to insure that the film unit will be advanced sufficiently to move it into engagement with the rolls. However, once the film unit is in engagement with the rolls the film-advancing member must be disenabled or prevented from withdrawing the next film unit, which, at this time, has not been exposed.

2. Description of the Prior Art

One solution to this problem is proposed in U.S. Pat. No. 3,447,437 issued on June 3, 1969. This patent discloses friction rolls adapted to be maintained in engagement with a film unit until the film unit has been exposed. Exposing the film unit initiates rotation of the friction rolls to move the exposed film unit into the bite of a pair of processing rolls. As the film unit passes between the processing rolls they are forced apart relative to each other to disenable or move the friction rolls in a direction away from the film container until the preceding film unit has moved out of engagement with the processing rolls. After the film unit has passed beyond the processing rolls the friction rolls, which at this stage are not rotating, are again moved into engagement with the next film unit to be exposed. However, maintaining the film-engaging members or friction rolls in contact with the film unit until the film unit has been exposed may adversely affect the film units. For example, maintaining the friction rolls in contact with the film unit over a long period of time could result in warping of the film unit.

SUMMARY OF THE INVENTION

Accordingly, an object of the invention is to provide, in photographic apparatus of the type set forth above including means for supporting a film unit in position for exposure to light admitted by a shutter and film advancing means for moving the film unit subsequent to exposure toward the exterior of the apparatus, means for enabling said film advancing means to move said film unit from said exposure position subsequent to exposure thereof and for disenabling the film-advancing means after a predetermined period of time has elapsed.

Another object of the invention is to provide in photographic apparatus of the type set forth above including film-advancing means for moving a film unit located in position for exposure out of said exposure position and a shutter for exposing the film unit, control means coupled to the shutter for enabling a portion of the film-advancing means to move into engagement with the film unit to move the film unit from the exposure position subsequent to exposure thereof, and means to disenable the film-advancing means upon tensioning or cocking of the shutter to move another film unit from the exposure position.

Other objects of the invention will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings wherein:

FIG. 1 is an elevation view, partly in section, of a folding type camera, the sectional part showing means for advancing a film unit from a container into a pair of pressure-applying members;

FIG. 2 is an enlarged view of the sectional part of FIG. 1;

FIG. 3 is a section taken along line 3—3 of FIG. 5;

FIG. 4 is an enlarged view of a film-advancing means which forms a portion of the instant invention;

FIG. 5 is an enlarged fragmentary section of the film-advancing means and control therefor, portions being cut away for purposes of clarity; and FIG. 6 is an elevation view of a portion of the shutter mechanism of the camera shown in FIG. 1.

DETAILED DESCRIPTION OF INVENTION

Reference is now made to FIG. 1 of the drawings wherein is illustrated a camera 10 of the folding type. Camera 10 includes housing sections 12, 14, 16, and 18 pivotally coupled to each other for movement between a folded position wherein the camera assumes a substantially paralellepipedon configuration and an extended, operative position, as shown in FIG. 1, wherein the housing sections cooperate to form sides of an exposure chamber the ends of which are closed by the walls 20 (only one of which is shown) of a flexible bellows. Housing section 12 includes means for supporting a plurality of film units 22 located within a container 24 with the forwardmost film unit (top film unit as viewed in FIG. 2) located in position for exposure. These means include a rear wall 26 and a forward wall 28 having an exposure opening 30 therein of a size corresponding to the area of the film unit 22 to be exposed. Aperture 30 is dimensioned to receive a lip 32 located on the forward wall 34 of film container 24 to properly locate the forwardmost film unit in position for exposure, lip 32 defining the exposure aperture of film container 24.

Housing section 14 has one of its ends pivotally coupled to housing section 12 at hinge 36 and its other end pivotally coupled to housing section 16. The exterior wall 38 of section 14 is provided with recesses 40 and 42 for receiving portions 44 and 46 respectively, of rangefinder-viewfinder 48. Rangefinder-viewfinder 48 is pivotally mounted at 50 to a pair of erecting links 52 (only one of which is shown). Each erecting link has its opposite end pivotally coupled at 53 to an inner frame member 55 of the camera. A pin 54 mounted intermediate the ends of each link cooperates with a groove or track 56 in each sidewall 58 of housing section 14 for transmitting forces to sections 12 and 14 as the erecting links 52 are rotated about pivot 53 in a counterclockwise manner (as viewed in FIG. 1) to move the various housing sections of the camera to the extended or operative position. A reflecting surface, e.g., a mirror, is mounted on the interior wall of housing section 14 for directing light admitted by the camera's shutter toward the forwardmost film unit located in position for exposure.

Housing section 18 is pivotally coupled to housing section 16 by hinge 60 and to the inner frame member 55 of the camera about an axis coincident with the axis of the top roll of a pair of rolls 62 which comprise a transport means for advancing a film unit toward the exterior of the camera. Section 18 includes an exposure system including an adjustable focus objective lens and shutter assembly, a photocell for controlling operation of the shutter, and a shutter release button. For a more detailed description of the camera reference is made to the copending application of Irving Erlichman, U.S. Ser. No. 824,097, filed May 13, 1969.

Camera 10 is preferably of the self-developing type and is adapted for use with film units of the type shown and described in detail in the copending u.S. applications of Edwin H. Land, Ser. No. 622,287 and Edwin H. Land, et al., Ser. No.

622,286 now abandoned, both filed Mar. 10, 1967 and generally referred to herein by reference numeral 22. Film units of this type each incorporates all of the materials necessary to produce a positive photographic print including a photosensitive element, a second or image-receiving element which is transparent and is secured in face-to-face relation with the photosensitive element, and a rupturable pod 64 of processing liquid secured to one end of the photosensitive and second elements for dispensing its liquid contents therebetween in response to the application of compressive pressure to pod 64. Each film unit 22 includes at least one aperture located along a side thereof which is parallel with the direction of travel of the film unit from the container 24 toward the rolls 62 for receiving a portion of a film-advancing means indicated generally at 66. The film units are adapted to be processed by advancing the film unit 22, pod 64 foremost, between the pressure applying members or rolls 62 which dispense the liquid contents of the pod 64 therefrom between the photosensitive and second elements and spread the liquid between and in contact with the two elements toward the trailing edge thereof.

Film-advancing means 66 includes a block-shaped member 68 slidably mounted within a U-shaped section 70 of inner frame member 55. Pivot means 72 are provided for coupling a film-engaging means 74 to member 68. Film-engaging means 74 includes a forwardly (to the right as viewed in FIG. 4) extending arm 76 which is terminated by a transversely extending pickup arm 78. An intermediate portion of arm 76, located near arm 78, is turned downwardly to form a film-engaging member 80 which is adapted to enter an elongated slot 83 in container 24 and one of the apertures in the film unit 22 located in position for exposure prior to moving the film unit toward the rolls 62. The center of gravity of the forwardly extending arm 76 is located to the right (as viewed in FIG. 4) of pivot 72 thereby providing a means whereby the film-engaging member 80 is urged downwardly into engagement with a film unit. Alternatively, a spring suitably mounted between film-engaging means 74 and pivot means 72 could perform the same function.

A drive means for imparting reciprocating motion to block-shaped member 68 and film-engaging member 80 is shown in FIGS. 4 and 5 and is identified generally by reference numeral 82. Drive means 82 includes a drive gear 84 suitably coupled to the camera's motor (not shown). Drive gear 84 is mounted in engagement with a gear 86 located on the end of the upper roll 62 (as viewed in FIG. 4). Gear 86 is in turn meshed with a similar gear 88 mounted on the end of the lower roll 62 to insure synchronization of the rotation of the rolls 62. Gear 86 is also in mesh with an idler gear 90 which in turn is in mesh with a relatively larger gear 92 mounted for rotation about bearing 94. A connecting link 96 having one of its ends pivotally coupled to block-shaped member 68 at 98 and its other end pivotally coupled to gear 92 by an eccentrically mounted pin 100 is provided for imparting reciprocating motion to the film-advancing means 66. Although a plurality of gears have been shown for transferring the power of the camera's motor to the rolls 62 and film-advancing means 66 it is within the scope of the invention to use any other suitable means, e.g., friction wheels.

The camera described above includes an electrical circuit having means for automatically recocking or tensioning the shutter mechanism after a predetermined period of time has elapsed since actuation of the shutter release to expose the forwardmost film unit. This predetermined period of time is at least as long as that required for the exposed film unit to move from the exposure position into the bite of rolls 62. Also, since the rolls 62 must continue to rotate to advance the film unit through the exit opening of the camera defined by portions of housing sections 12 and 18 and because the film-advancing means 66 continues to reciprocate because of its connection with the rolls 62, a control means must be provided to disenable the film-advancing means 66 to move another film unit from the exposure position until the shutter mechanism has been actuated again, thereby preventing the withdrawal of a film unit from the exposure position prior to it being exposed. In other words, the control means must disenable the film-advancing means to prevent withdrawal of another film unit until the preceding film unit has moved a predetermined distance. This control means is shown in FIGS. 2, 3, 5 and 6 and includes an arm 102 having one end pivotally mounted to a portion of housing member 18 by pivot means 104 and its other end terminating in an outwardly turned flange 106. The control means further includes a resilient member 108 having a U-shaped end 110 is suitably attached to arm 102 by pins 112 and recessed portion 114 for movement therewith. A shutter blade 116 (only a portion of which is shown) is also mounted within housing section 18 for rotation about the axis of pivot means 104 between a first position wherein the shutter blade is in an uncocked condition and a second position wherein the blade is in a cocked or tensioned condition. Blade 116 includes means for disenabling the film-advancing means 66 to move another film unit from the exposure position until the preceding film unit has moved a predetermined distance, e.g., at least the distance between the rolls 62 and the leading end of the film unit located in position for exposure. The disenabling means includes an outwardly turned flange or tab 118 positioned to engage flange 106 when the shutter blade is moved into the second position, i.e., the tensioned or cocked condition, as shown in FIG. 6. The term tensioned or cocked condition is used herein to describe a shutter blade which is ready to be actuated by, e.g., the shutter release button to expose a film unit. As can be seen in FIG. 6 clockwise rotation of the disenabling means or flange 118 into engagement with flange 106 has caused U-shaped end 110 to depress or move the upturned end 120 of a lever 122 from the dotted line position of FIG. 6 to the position shown in solid lines. As can best be seen in FIG. 3, lever 122 is mounted in a position overlying film container 24 by a pair of pins 124 and maintained in place by retainer members 126 mounted on pins 124. Pins 124 enable lever 122 to rotate about an axis which joins the two pins 124 and which is parallel with the direction of movement of a film unit from the film container into the bite of the rolls 62. Lever 122 includes a recessed portion 128 located on the opposite side of pins 124 from that of end 120. Recessed portion 128 is positioned below and in continuous sliding engagement relative to pickup arm 78 to move film-engaging member 80 out of engagement with a film unit, i.e., to disenable the film-engaging member upon downward movement of U-shaped end 110.

In the operation of the camera, actuation of the shutter release allows counterclockwise rotation of shutter blade 116 about axis 104 to expose the forwardmost film unit (top one as viewed in FIG. 2) and also initiates operation of the camera's motor to rotate gear 84. Rotation of gear 84 will rotate gears 86, 88, 90 and 92 in the direction shown by the arrows in FIG. 4 to simultaneously rotate rolls 62 and reciprocate the film-advancing means 66. Counterclockwise rotation of shutter blade 116 allows upturned end 120 of lever 122 to move to the dotted line position shown in FIG. 6, i.e., lever 122, under the influence of the weight of arm 76 or its spring bias, has been rotated in a counterclockwise manner (as viewed in FIG. 3) about the axis joining the two pins 124 to allow film-engaging member 80 to move into engagement with the forwardmost film unit. In this latter position, film-engaging member 80 engages one of the apertures in the forwardmost film unit and moves the film unit from the container via an opening 130 in an end wall thereof into the bite of the rolls 62. After the leading edge of the film unit has entered the bite of the rolls, the shutter mechanism is automatically tensioned or recocked. Tensioning or recocking of the shutter mechanism rotates shutter blade 116 in a clockwise manner until the blade reaches the position shown in FIG. 6. In this position the disenabling means 118 engages flange 106 and rotates arm 102 in a clockwise manner until U-shaped end 110 is holding end 120 of lever 122 in the position shown in FIG. 3 wherein, although the film-advancing means 66 is still reciprocating, it is disenabled to move another film unit from the film container because film engaging member 80 has been raised by end 128 of lever 122 to a position wherein it cannot engage another film unit until the shutter has been actuated again. The camera's motor is stopped after the film unit has been processed by the rolls 62.

From the foregoing it can be seen that there has been disclosed a novel film-advancing means and control therefor which is simple and dependable. The control insures that the film-advancing means is enabled to move a film unit from the film container into the bite of the rolls when the camera's shutter mechanism is actuated and a disenabling means is provided to disenable or prevent the film-advancing means to move another film unit until the preceding film unit has at least entered the bite of the rolls. Although the disenabling means has been shown as part of the shutter blade it is within the scope of the invention to disenable the film-advancing means in other ways, e.g., suitable means actuated by a time delay in the camera's electrical circuit could be used to perform the disenabling feature.

Since certain changes may be made in the above apparatus without departing from the scope of the invention herein involved, it is intended that all matter contained in the above description or shown in the accompanying drawings shall be interpreted as illustrative and not in a limiting sense.

We claim:

1. In photographic apparatus including support means for supporting a plurality of the film units with one of the film units located in position for exposure and shutter means for admitting light into the interior of said apparatus for exposing said one film unit, the improvement comprising:
    film-advancing means including film-engaging means for engaging a film unit located in position for exposure and moving said film unit from said position;
    means for driving said film-advancing means;
    control means responsive to actuation of said shutter means for enabling movement of said film-advancing means into engagement with said film unit to move said film unit from said position; and
    disenabling means responsive to recocking of said shutter means for disenabling said film-advancing means to move another film unit from said position until the preceding film unit has moved a predetermined distance from said position, said disenabling means being adapted to move and maintain said film-engaging means out of engagement with a film unit until the next succeeding film unit has been exposed.

2. In photographic apparatus including support means for supporting a plurality of film units with one of the film units located in position for exposure and shutter means for admitting light into the interior of said apparatus for exposing said one film unit, the improvement comprising:
    film-advancing means including film-engaging means for engaging a film unit located in position for exposure and moving said film unit from said position;
    means for driving said film-advancing means;
    control means responsive to actuation of said shutter means for enabling said film-advancing means to move said film unit from said position; and
    disenabling means including a shutter blade mounted for movement into engagement with said control means when said shutter means is moved into a cocked position for disenabling said film-advancing means to move another film unit from said position until the preceding film unit has moved a predetermined distance from said position.

3. In photographic apparatus including support means for supporting a plurality of film units with one of the film units located in position for exposure and shutter means for admitting light into the interior of said apparatus for exposing said one film unit, the improvement comprising:
    film-advancing means including film-engaging means for engaging a film unit located in position for exposure and moving said film unit from said position;
    means for driving said film-advancing means in a reciprocating manner;
    control means responsive to actuation of said shutter means for enabling said film-advancing means to move said film unit from said position; and
    disenabling means responsive to recording of said shutter means for moving said film-engaging means to a position out of engagement with a film unit, thereby disenabling said film-advancing means to move another film unit from said position until the preceding film unit has moved a predetermined distance from said position.

4. Photographic apparatus as defined in claim 3 wherein said control means include a lever pivotally coupled intermediate its ends to said apparatus and an arm for pivoting said lever, said lever having one of its ends continuously in engagement with said film-engaging means for slidably supporting the latter and the other end located in position for engagement by said arm whereby movement of said arm moves said film-engaging member out of engagement with said film unit.

5. Photographic apparatus as defined in claim 4 wherein said arm is moved in response to recocking of said shutter means.

6. Photographic apparatus as defined in claim 5 further including means for biasing said film-engaging member into engagement with said film unit, and said arm applies a force in opposition to the force of said biasing means for moving said film-engaging member out of engagement with said film unit when said shutter means is moved into a cocked position.

7. Photographic apparatus as defined in claim 6 further including transport means mounted adjacent said film-advancing means for receiving said film unit from said film-advancing means and moving said film unit toward the exterior of said apparatus, said means for driving said film-advancing means including means for simultaneously driving said transport means.

8. Photographic apparatus as defined in claim 1 wherein said control means allows said film-engaging means to move into engagement with said film unit in response to actuation of said shutter means.

* * * * *

UNITED STATES PATENT OFFICE
CERTIFICATE OF CORRECTION

Patent No. 3,640,200                     Dated February 8, 1972

Inventor(s) Lawrence M. Douglas and Irving Erlichman

It is certified that error appears in the above-identified patent and that said Letters Patent are hereby corrected as shown below:

Column 6, line 23, "recording" should be --recocking--.

Signed and sealed this 24th day of April 1973.

(SEAL)
Attest:

EDWARD M. FLETCHER, JR.                 ROBERT GOTTSCHALK
Attesting Officer                       Commissioner of Patents